United States Patent
Kitazawa et al.

(10) Patent No.: US 9,090,784 B2
(45) Date of Patent: Jul. 28, 2015

(54) SOLID DRAWING MATERIAL AND SOLID DRAWING TOOL

(75) Inventors: Katsunori Kitazawa, Fujioka (JP); Suguru Yazawa, Fujioka (JP); Masaaki Matsumoto, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 230 days.

(21) Appl. No.: 13/814,394

(22) PCT Filed: Aug. 5, 2011

(86) PCT No.: PCT/JP2011/067932
§ 371 (c)(1),
(2), (4) Date: Mar. 21, 2013

(87) PCT Pub. No.: WO2012/018107
PCT Pub. Date: Sep. 2, 2012

(65) Prior Publication Data
US 2013/0177345 A1    Jul. 11, 2013

(30) Foreign Application Priority Data
Aug. 5, 2010 (JP) ................................. 2010-176170

(51) Int. Cl.
| | |
|---|---|
| *B43K 19/14* | (2006.01) |
| *C09D 13/00* | (2006.01) |
| *B43K 19/02* | (2006.01) |
| *B43K 19/16* | (2006.01) |
| *B43K 19/18* | (2006.01) |
| *B43K 19/00* | (2006.01) |

(52) U.S. Cl.
CPC ............... *C09D 13/00* (2013.01); *B43K 19/00* (2013.01); *B43K 19/02* (2013.01); *B43K 19/14* (2013.01); *B43K 19/145* (2013.01); *B43K 19/16* (2013.01); *B43K 19/18* (2013.01)

(58) Field of Classification Search
CPC ....... C09D 13/00; B43K 19/14; B43K 19/145
USPC .............................................. 401/49, 88, 96
See application file for complete search history.

(56) References Cited

U.S. PATENT DOCUMENTS

| | | | | |
|---|---|---|---|---|
| 4,019,822 | A * | 4/1977 | Matsumoto et al. | 401/96 |
| 2002/0195021 | A1 | 12/2002 | Seki et al. | |
| 2008/0292668 | A1 * | 11/2008 | Baars et al. | 424/401 |
| 2010/0003061 | A1 | 1/2010 | Andreas | |

FOREIGN PATENT DOCUMENTS

| | | |
|---|---|---|
| CN | 1385319 A | 12/2002 |
| CN | 101522392 A | 9/2009 |
| JP | 58-209600 A | 12/1983 |
| JP | 3-221574 A | 9/1991 |
| JP | 2001-316608 A | 11/2001 |
| JP | 2004-315602 A | 11/2004 |
| JP | 2008-45043 A | 2/2008 |
| JP | 2010-37434 A | 2/2010 |

\* cited by examiner

OTHER PUBLICATIONS

Fusegawa, K, "Properties and Applications of Wax", Saiwai Shobo, Sep. 10, 1983, w/ English translation.

*Primary Examiner* — David Walczak
*Assistant Examiner* — Joshua Wiljanen
(74) *Attorney, Agent, or Firm* — Westerman, Hattori, Daniels & Adrian, LLP (57) ABSTRACT

A solid drawing material with which it is possible to smoothly and darkly draw on a smooth non-absorbing surface, as well as on conventional high-quality paper, drawing paper, or copy paper, and with which it is also possible to draw darkly and clearly on a transparent flat surface, and to easily erase a drawing on these non-absorbing surfaces using a fabric, paper, or whiteboard eraser. A solid drawing material containing at least a resin component, a wax component, a pigment, titanium dioxide, and a filler, wherein the resin component includes rosin and/or modified rosin in an amount that is within the range of 0.5 to 20 wt %, and the wax component includes a glycerin fatty acid ester and/or pentaerythritol fatty acid ester, both fatty acid esters having a melting point of 45° C. or higher, in an amount that is within the range of 8 to 50 wt %.

13 Claims, 3 Drawing Sheets

Fig. 4

SOLID DRAWING MATERIAL AND SOLID DRAWING TOOL

TECHNICAL FIELD

The present invention mainly relates to a solid drawing material which can draw smoothly and darkly on smooth non-absorbing surfaces of a coated paper, plastic, metal, glass, and whiteboard, as well as papers such as a conventional high-quality paper, a drawing paper, and a copy paper. More particularly, it relates to a solid drawing material which can draw darkly and clearly on transparent plate surfaces of a transparent plastic and glass or the like, and also can easily erase a drawing on these non-absorbing surfaces using a fabric, papers such as a tissue paper, and a whiteboard eraser. Moreover, it relates to a solid drawing tool which is obtained by winding a protective sheet around the outer periphery of the solid drawing material, and which can be used by being cut using a pencil sharpener like a conventional pencil.

BACKGROUND ART

Regarding a conventional solid drawing material, its hardness is adjusted by optionally adding oils and resins to a blend of a wax, a pigment and a filler. However, when the amount of the oil is increased for the purpose of softening the solid drawing material, it breaks easily because of a decrease in its strength. In that case, it becomes impossible to form it into a thin shape, or to make its tip sharpened by cutting, and thus failing to perform fine drawing. Moreover, there is a problem that, when drawing on smooth non-absorbing surfaces of a coated paper, plastic, metal, glass, whiteboard and the like, it is impossible to draw darkly, regardless of its softness, because of slipping on the surfaces.

On the other hand, when the amount of the resin is increased so as to enhance its strength, it is possible to form it into a thin shape, but causes a problem that it is impossible to draw on smooth non-absorbing surfaces of a coated paper, plastic, metal, glass, whiteboard and the like because of its hardness.

For example, there is disclosed, as an unfired color pencil, the composition of a soft color lead having excellent colorability, containing a mixture of a glycerin fatty acid ester and/or pentaerythritol fatty acid ester each having a melting point of 65° C. or lower, rosin and/or a modified rosin (Patent Literature 1). The object of this patent literature is to obtain an oil painting-like work by dissolving the portion drawn on a canvas using oil for oil painting, and is different from the object of a solid drawing material of the present invention which is drawn on smooth non-absorbing surface of a coated paper, plastic, metal, glass whiteboard and the like.

There is also disclosed the composition of a solid drawing material which enables smooth drawing even on a non-absorbing drawing surface by containing, as a solid drawing material, a pigment, a wax and a mineral oil, and further containing a non-crystalline poly α-olefin and rosin in a given ratio (Patent Literature 2). However, it is required for this composition to contain 5% by weight or more of the mineral oil, and thus making it impossible to perform thin forming because of low strength. Actually, reference is not made to a diameter or the like of a molding even in Examples of the same literature.

By the way, in the chemical definition, wax refers to an "ester of fatty acid and a higher monohydric or dihydric alcohol". In the definition, the wax also includes a wax which is liquid at normal temperature, like jojoba oil, for example, and a wax which is solid at normal temperature. However, usually, it may be considered that an "organic substance which is solid or semisolid at normal temperature", and which is "melted at a temperature ranging from normal temperature to about 100° C., and has low melt viscosity" is collectively referred as a wax (Non-Patent Literature 1). Specifically, in addition to waxes according to the above chemical definition, esters of a trihydric (glycerin) or tetrahydric (pentaerythritol) alcohol belonging to the category of oils and fats and fatty acid, petroleum-based hydrocarbons such as paraffin wax, petrolatum, and microcrystalline wax, fatty acid alone and other substances are collectively referred to as the wax.

Of those collectively referred to as the "wax" mentioned above, most of those defined as "fatty acid and higher monohydric or dihydric alcohol" are inferior in compatibility with rosin, and modified rosin such as a glycerin ester of rosin.

To the contrary, an ester of trihydric (glycerin) or tetrahydric (pentaerythritol) alcohol and fatty acid has satisfactory compatibility with rosin, and modified rosin such as a glycerin ester of rosin.

As mentioned above, in the present invention, an "organic substance which is solid or semisolid at normal temperature", and which is "melted at a temperature ranging from normal temperature to about 100° C., and has low melt viscosity", especially an organic substance having a temperature at which it melts (a melting point) of 110° C. or lower is referred to as a "wax".

CITATION LIST

Patent Literature

Patent Literature 1
JP 2008-45043 A (Claims, Examples, etc.)
Patent Literature 2
JP 2010-37434 A (Claims, Examples, etc.)

Non-Patent Literature

Non-Patent Literature 1
"Properties and Applications of Wax", Revised Second Edition, supervised by Kenzo Fusegawa, Saiwai Shobo, published on Sep. 10, 1983

SUMMARY OF INVENTION

Technical Problem

In view of the above problems of the prior arts, the present invention is intended to solve them. Specifically, an object of the present invention is to provide a solid drawing material which has smooth writing feel, and can also draw noticeably darkly especially on smooth non-absorbing surfaces of a coated paper, plastic, metal, glass, a whiteboard and the like. More specifically, another object of the present invention is to provide a solid drawing material which has excellent mechanical strength such as bending strength and is less likely to break while being capable of drawing darkly and clearly on transparent drawing surfaces of a transparent plastic, glass and the like. Still another object of the present invention is to provide a solid drawing material a drawing by which on these non-absorbing surfaces can be easily erased using a fabric, papers such as a tissue paper, and a whiteboard eraser. A yet another object of the present invention is to provide a solid drawing tool which can newly expose its tip portion capable of drawing, accompanied by abrasion of the solid drawing material, while covering the outer periphery of the solid drawing material with a protective sheet without providing the protective sheet with special structures for peeling and separation, such as perforation and notch.

Solution to Problem

The present inventors have intensively studied so as to achieve the above objects and found that the above objective solid drawing material including at least a resin, a wax, a pigment, titanium dioxide and a filler can be obtained by containing, as a resin, rosin and/or modified rosin such as a glycerin ester of rosin in the amount within a range from 0.5% by weight to 20% by weight, and containing, as waxes, a glycerin fatty acid ester and/or a pentaerythritol fatty acid ester, each having a melting point of 45° C. or higher in the amount within a range from 8% by weight to 50% by weight. Thus, the present invention has been completed as follows.

(1) First Invention

In view of the above problems, a first invention of the present application is related to a solid drawing material including at least a resin component, a wax component, a pigment, titanium dioxide and a filler, containing, as the resin component, at least one of rosin and a modified rosin in the amount within a range of 0.5% by weight or more and 20% by weight or less, and containing, as the wax component, at least one of a glycerin fatty acid ester and a pentaerythritol fatty acid ester, each having a melting point of 45° C. or higher in the amount within a range of 8% by weight or more and 50% by weight or less.

In the present invention, rosin and modified rosin used as the "resin component" are not particularly limited as long as they are commonly classified into rosin and modified rosin, and any rosin and modified rosin can be used. Moreover, it is also possible to use abietic acid which is a main component of rosin. As used herein, the "modified rosin" refers to a glycerin ester of rosin and the like.

These rosins can be used alone, or used in combination of two or more kinds without distinguishing between chemical and natural products, and they are appropriately selected depending on colorability and hardness of the objective solid drawing material.

The content of the resin component is within a range of 0.5% by weight or more and 20% by weight or less. When the content is less than 0.5% by weight, the obtained solid drawing material is inferior in fixing properties on a smooth surface and insufficient in coloration, and is also inferior in strength, thus being not practical. In contrast, when the content is more than 20% by weight, the obtained solid drawing material is hard and is also inferior in fixing properties on a smooth surface and insufficient in coloration.

In the present invention, a glycerin fatty acid ester used as the "wax component" is not particularly limited as long as it has a melting point of 45° C. or higher and is commonly classified into a glycerin fatty acid ester, and any glycerin fatty acid ester can be used. For example, it is possible to use all of palmitic acid glyceride and stearic acid glyceride, and monoglyceride, diglyceride, and triglyceride, each having a melting point of 45° C. or higher. Furthermore, it is also possible to use, other than these esters, all natural products each containing a glycerin fatty acid ester as a main component, such as Japan waxes such as haze wax and urushi wax; and sumac waxes such as woodland sumac wax and Japanese sumac wax.

In the present invention, a pentaerythritol fatty acid ester used as the "wax component" is not particularly limited as long as it has a melting point of 45° C. or higher and is commonly classified into a pentaerythritol fatty acid ester, and any pentaerythritol fatty acid ester can be used. For example, it is possible to use all of pentaerythritol palmitate and pentaerythritol stearate and monopentaerythritol, dipentaerythritol, tripentaerythritol, and tetrapentaerythritol, each having a melting point of 45° C. or higher. When the melting point is lower than 45° C., the obtained solid drawing material has exceedingly low practical strength and, if the solid drawing material is thinly formed, it is likely to break easily.

These glycerin fatty acid ester and pentaerythritol fatty acid ester used in the present invention can be used alone, or used in combination of two or more kinds without distinguishing between chemical and natural products, and they are appropriately selected depending on colorability and hardness of the objective solid drawing material.

The content of the wax component is within a range of 8% by weight or more and 50% by weight or less. When the content is less than 8% by weight, the obtained solid drawing material is hard and is inferior in fixing properties on a smooth surface, and thus resulting in insufficient coloration. In contrast, when the content is more than 50% by weight, the obtained solid drawing material is inferior in strength, and thus not practical.

It is possible to use, as the "pigment" in the present invention, all of azo-based organic pigments such as disazo yellow AAA and pyrazolone orange, cyanine-based organic pigments such as phthalocyanine blue and phthalocyanine green, higher organic pigments such as quinacridone red, dyeing pigments such as fanal color, fluorescent pigments, and inorganic pigments such as carbon black, iron black, red iron oxide, and Prussian blue.

It is possible to use, as the "titanium dioxide" in the present invention, any conventionally known titanium dioxide regardless of types, for example, rutile and anatase. However, for the purpose of drawing darkly and clearly on transparent plate surfaces of a transparent plastic and glass, titanium dioxide for catalyst is not preferable since titanium dioxide has a small particle size, and thus resulting in a pale drawing surface.

It is possible to use, as the "filler" in the present invention, any known filler, such as calcium carbonate, kaolin, talc, precipitated barium sulfate, mica, boron nitride, and whiskers such as potassium titanate whisker and basic magnesium sulfate whisker.

(2) Second Invention

Moreover, a second invention of the present application is characterized, in addition to the feature of the first invention, in that a ratio of the resin component to the wax component is within a range from 2:1 to 1:25.

When the ratio of the content of the resin component to that of the wax component is less than 1:25, the obtained solid drawing material is brittle, and is also insufficient in fixing properties on a smooth surface and is insufficient in coloration. Moreover, the ratio of the content of the resin component to that of the wax component is more than 2:1, the solid drawing material becomes hard and is insufficient in colorability.

In short, if the resin component is mixed with the wax component in a preferable ratio (i.e., within a range from 2:1 to 1:25), it is possible to obtain a solid drawing material having satisfactory fixing properties on a smooth surface and satisfactory coloration.

There is no particular limitation on the production method, thus it is possible to perform melt mixing of the resin component with wax component in advance, and to mix with the other blend in a mixer in the production process of a solid drawing material.

(3) Third Invention

Moreover, a third invention of the present application is characterized, in addition to the feature of the first invention, by containing 5% by weight or more of the titanium dioxide.

When the content of titanium dioxide is less than 5% by weight, it is impossible to draw darkly and clearly on transparent plate surfaces of a transparent plastic and glass, thus resulting in a pale drawing surface, which is not preferable.

(4) Fourth Invention

Moreover, a fourth invention of the present application is characterized, in addition to the feature of the first invention, by containing, in addition to the resin component, the wax component, the pigment, the titanium dioxide and the filler, a component having a melting point of 40° C. or lower in the amount within a range of 4.5% by weight or less.

That is, it is also possible to use a glycerin fatty acid ester and a pentaerythritol fatty acid ester and wax such as jojoba oil, and natural or synthetic oils such as spindle oil, liquid paraffin, squalane, squalene, α-olefin oligomer and silicone oil, each having a melting point of lower than 45° C., as long as an averse influence is not exerted on preferred content of the respective components. It is also possible to use components having a melting point of 40° C. or lower (for example, organic components such as wax and oil, each having a melting point of 40° C. or lower) as long as the content is 4.5% by weight or less based on the entire solid drawing material. However, when it is intended to form the solid drawing material into a thin shape or to make the tip of the solid drawing material sharp, it is preferred that the solid drawing material does not contain these components having a low melting point from the viewpoint of the strength if it is possible.

(5) Fifth Invention

Moreover, a fifth invention of the present application is characterized, in addition to the feature of the first invention, by further containing at least one of polyethylene and an ethylene-vinyl acetate copolymer in the amount within a range of 20% by weight or less as an additional resin component other than the resin component, and containing one or a mixture of more selected from a group consisting of paraffin wax, ozocerite, Fischer-Tropsch wax and polyethylene wax each having a melting point of 45° C. or higher in an amount within a range of 30% by weight or less.

That is, for the purpose of improving the strength and adjusting hardness and writing feel, etc., it is possible to use, as an additional resin component, 20% by weight or less of polyethylene and/or an ethylene-vinyl acetate copolymer in combination with the resin component. When the content of the additional resin component is more than 20% by weight, the obtained solid drawing material is inferior in moldability and tinting strength to smooth non-absorbing surfaces of a coated paper, plastic, metal, glass, a whiteboard and the like, thus resulting in pale drawn line, which is not preferable.

In the above case, the total content of the resin component and the additional resin component is preferably adjusted to 30% by weight or less taking account of density of the drawn line and fixing properties in the case of drawing on smooth non-absorbing surfaces of a coated paper, plastic, metal, glass, a whiteboard and the like.

Moreover, since polyethylene and/or an ethylene-vinyl acetate copolymer as the additional resin component has/have low compatibility with a glycerin fatty acid ester and/or pentaerythritol fatty acid ester, each having a melting point of 45° C. or higher, as the resin component, these components are used in combination with, as the additional wax component, 30% by weight or less of one or a mixture of more selected from a group consisting of paraffin wax, ozocerite, Fischer-Tropsch wax, and polyethylene wax, each having melting point of 45° C. or higher.

Although it is possible to use known conventional ozocerite, Fischer-Tropsch wax, and polyethylene wax used as the additional wax component, paraffin wax preferably has a melting point of 45° C. or higher in view of the strength. The content is preferably adjusted to 30% by weight or less in view of drawn line density and fixing properties in the case of drawing on smooth non-absorbing surfaces of a coated paper, plastic, metal, glass, a whiteboard and the like.

Moreover, the total content of the wax component and the additional wax component is generally preferably 70% by weight or less, and desirably 65% by weight or less in view of the strength. Furthermore, the total content of the wax component and the additional wax component is desirably adjusted to 60% by weight or less in view of drawn line density and fixing properties in the case of drawing on smooth non-absorbing surfaces of a coated paper, plastic, metal, glass, a whiteboard and the like.

(6) Sixth Invention

Moreover, a sixth invention of the present application is characterized, in addition to the feature of the fifth invention, in that the polyethylene is one or a mixture of more selected from the a group consisting of low-density polyethylene, linear low-density polyethylene, and ultra low-density polyethylene, and the ethylene-vinyl acetate copolymer contains 30% by weight or less of vinyl acetate, and also has a melt flow rate of 2 g/minute or more.

That is, it is preferred to select, as the polyethylene used in the present invention, any one or a mixture of more of low-density polyethylene, linear low-density polyethylene, and ultra low-density polyethylene from the viewpoint of kneadability with other blending materials, moldability, and drawn line density and fixing properties in the case of drawing on smooth non-absorbing surfaces of a coated paper, plastic, metal, glass, a whiteboard and the like. Furthermore, it is desired to select from those having a melt flow rate of 2 g/minute or more.

Moreover, it is preferred to select, as the ethylene-vinyl acetate copolymer used in the present invention, from those which contain 30% by weight or less of vinyl acetate and have a melt flow rate of 2 g/minute or more, from the viewpoint of kneadability with other blending materials, moldability, and drawn line density and fixing properties in the case of drawing on smooth non-absorbing surfaces of a coated paper, plastic, metal, glass, a whiteboard and the like.

(7) Seventh Invention

Moreover, a seventh invention of the present application is characterized, in addition to the fifth or sixth invention, in that a ratio of the additional resin component to the additional wax component is within a range from 3:1 to 1:20.

Herein, when the ratio of the additional resin component to that of the additional wax component is more than 3:1, the solid drawing material becomes hard, and thus resulting in insufficient colorability. Moreover, when the ratio of the additional resin component to that of the additional wax component is less than 1:20, the obtained solid drawing material becomes brittle, and thus resulting in insufficient strength.

(8) Eighth Invention

Moreover, a solid drawing tool according to an eighth invention of the present application comprises the solid drawing material according to the above first invention, and a protective sheet which is wound around the outer peripheral surface of the solid drawing material two times or more, and the solid drawing material is capable of being sharpened together with the protective sheet by a pencil sharpener.

The "protective sheet" refers to a sheet-like structure which is wound around the outer peripheral surface of the solid drawing material so as to prevent contamination of fingers, and to protect or reinforce the solid drawing material.

Further, a "solid drawing tool" is the object which is obtained by winding the protective sheet around the solid drawing material.

The protective sheet used in the present invention, which is wound around the solid drawing material two times or more, includes, but is not particularly limited to, plastics such as a synthetic resin and a natural resin, a ceramic, metal, a paper, and a wood material, as long as it is cuttable by a pencil sharpener, and any protective sheet can be used. Taking account of winding two times or more, the material is appropriately selected. That is, the material of the protective sheet is desirably a paper or a synthetic resin taking account of flexibility due to winding plural times, thickness, and durability and cuttability of a blade of a pencil sharpener in the case of cutting using the pencil sharpener.

The paper as the material of the protective sheet is desirably a surface-process paper such as an art paper or a coated paper, or a synthetic paper containing a resin such as polypropylene blended therein taking account of deterioration of cuttability due to swelling of fibers caused by absorption of moisture.

Moreover, the synthetic resin as the material of the protective sheet is not specifically limited as long as it is a known sheet material or film material, and any synthetic resin can be used. However, taking account of the strength and cuttability by a pencil sharpener, it is desired to use polyesters such as polyethylene terephthalate, nylon, polystyrene, polyvinyl chloride, or a biaxially oriented polypropylene.

Moreover, in view of the strength and prevention of scattering of pencil shavings upon cutting, it is desired that an adhesive is partially or entirely applied to the inner surface side of the protective sheet. The material of the adhesive is not particularly limited as long as it has hitherto been used in a sticker, a sheet, and a film, and any material can be used.

In order to fix the solid drawing material and the protective sheet, it is desired that an adhesive is applied to the site corresponding to the innermost layer of the protective sheet. Moreover, it is necessary for the outermost layer of the protective sheet to fix to the layer directly under the outermost layer using an adhesive. The adhesive may or may not be applied to the middle portion therebetween. Alternatively, it is also possible to vary the adhesive strength by the use of an adhesive with a weak adhesion force, and to appropriately select the adhesive strength depending on the required characteristics.

Moreover, in the present invention, since the protective sheet is wound around the solid drawing material two times or more, when the protective sheet is extremely thin, wrinkles are likely to be formed. Moreover, when the protective sheet is too thick, a difference in level is likely to be formed at the portion where the protective sheet and the marginal portion of the innermost layer are laid one upon another, and thus the protective sheet is hard to wind at normal temperature and is likely to be peeled off with the lapse of time. Therefore, the thickness of the protective sheet is generally preferably 1 µm or more and 200 µm or less, and more preferably 5 µm or more and 150 µm or less.

Moreover, when the number of wound layers of the protective sheet is less than two, less strength reinforcing effect is exerted. Even when the number is too large, shifts may occur to form a production-related problem. Therefore, it is desired that the diameter of the inner solid drawing material and the thickness of the protective sheet are adjusted, and then the protective sheet is generally wound three to twenty times.

(9) Others

Moreover, it is possible to appropriately select waxes such as conventionally known carnauba wax, candelilla wax, rice wax, montan wax, microcrystalline wax, ketone wax, polypropylene wax, and various fatty acid amides; and metal soaps such as zinc stearate and lithium stearate, and to blend them in addition to the above respective components.

In this case, the total content of these components and the above-mentioned wax component (or the above-identified wax component and the above-identified additional wax component) is generally preferably 70% by weight or less. In view of the strength, the total content is desirably 65% by weight or less, and more desirably 60% by weight or less taking account of drawn line density and fixing properties in the case of drawing on smooth non-absorbing surfaces of a coated paper, plastic, metal, glass, a whiteboard, and the like.

In the present invention, for the purpose of dissolving a drawn line in water and wiping off the drawn line, it is possible to blend various additives which have hitherto been known in an aqueous color pencil, such as surfactants and ultraviolet absorbers, as long as the above-mentioned features such as strength, drawing on a smooth non-absorbing surface, and easy erasability are not lowered.

Advantageous Effects of Invention

In a conventional solid drawing material, a mixing ratio of oil has been increased so as to soften the solid drawing material. As a result, the obtained solid drawing material has low strength, and also causes slipping on a smooth surface due to bleed of oil, regardless of softness, and thus failing to obtain sufficient colorability.

To the contrary, in a solid drawing material of the present invention, the content of a liquid component such as oil can be reduced to the limit by a combination and a mixing ratio of a specific resin and waxes, and thus obtaining a solid drawing material which is strong and can also draw on a smooth non-absorbing surface.

That is, according to the present invention, there is provided a solid drawing material which has smooth writing feel, and can also draw noticeably darkly especially on smooth non-absorbing surfaces of a coated paper, plastic, metal, glass, a whiteboard and the like. More specifically, there is provided a solid drawing material which has excellent mechanical strength such as bending strength and is less likely to break easily while being capable of drawing darkly and clearly on transparent drawing surfaces of a transparent plastic and glass. Moreover, there is provided a solid drawing material which can easily erase a drawing on these non-absorbing surfaces using a fabric, papers such as a tissue paper, and a whiteboard eraser. Moreover, there is provided a solid drawing tool which can newly expose a tip portion capable of drawing, accompanied by abrasion of the solid drawing material, while covering the outer periphery of the solid drawing material with a protective sheet without providing the protective sheet with special structures for peeling and separation, such as perforation and notch.

DESCRIPTION OF EMBODIMENTS

The present invention will be described more specifically below by way of Examples and Comparative Examples.

(1) Compositions and Production Methods of Examples and Comparative Examples (1-1) Example 1

Figure 1:
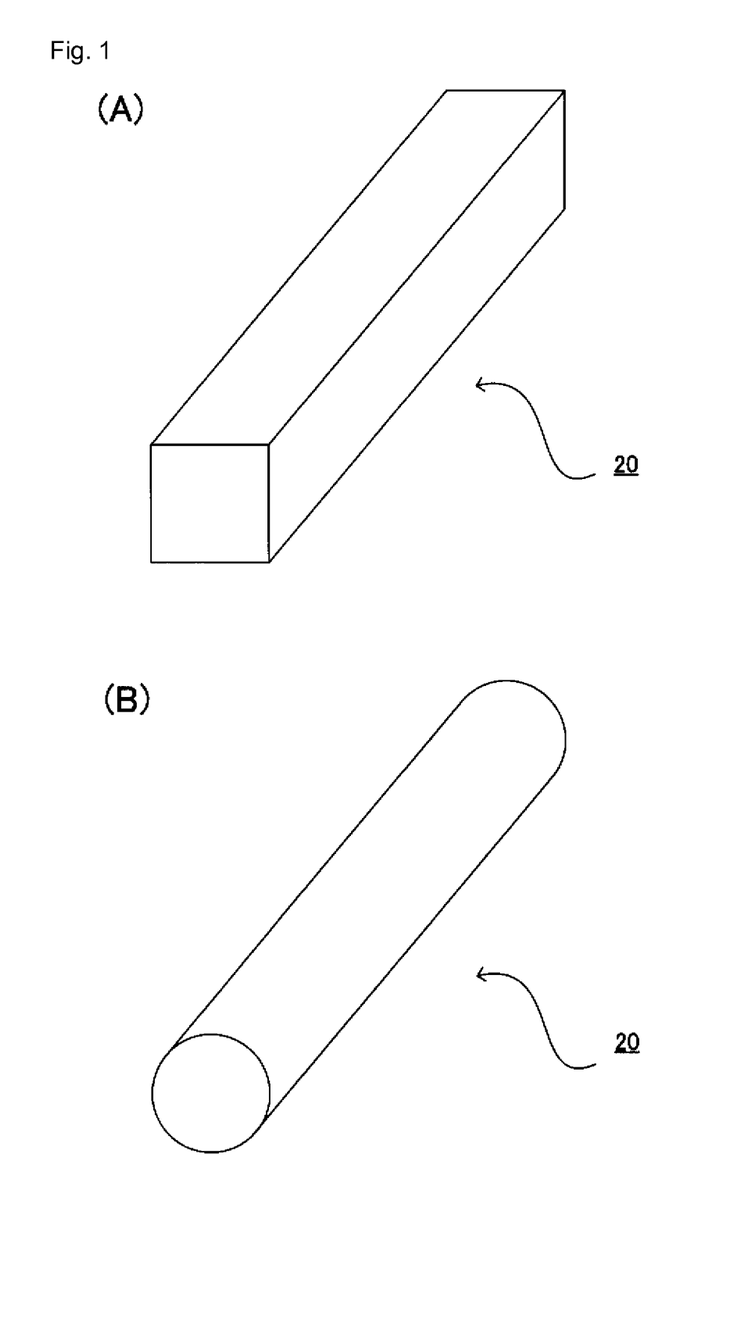
FIG. 1 Perspective views showing solid drawing materials according to Examples of the present invention formed in the shape of a quadrangular prism (A), and in the shape of a column (B).

Haze wax (melting point: 52° C.): 43% by weight
Rosin: 16% by weight
Talc: 17% by weight
Titanium dioxide: 14% by weight
Disazo yellow AAA: 2% by weight
Phthalocyanine green: 8% by weight According to the above formulation, components were mixed under heating in a kneader and dispersed. The mixture was then kneaded by a twin roll, hot-melted, and poured into a predetermined mold, followed by solidification under cooling to obtain a green solid drawing material 20 with a cross section of 8.0 mm square as shown in FIG. 1(A).

(1-2) Example 2

Stearic acid glyceride (melting point: 61° C.): 43% by weight
Rosin ester: 16% by weight
Talc: 18% by weight
Titanium dioxide: 12% by weight
Permanent red: 11% by weight According to the above formulation, components were mixed under heating in a kneader, dispersed and then kneaded by a twin roll. The kneaded mixture was subjected to extrusion molding by a plunger extruder to obtain a red solid drawing material 20 of 8.0 mm in diameter as shown in FIG. 1(B).

(1-3) Example 3

Urushi wax (melting point: 52° C.): 15% by weight
Rosin ester: 6% by weight
Fischer-Tropsch wax (melting point: 110° C.): 21% by weight
Montan wax: 12% by weight
Low-density polyethylene (manufactured by Sumitomo Chemical Co., Ltd.): 15% by weight
Kaolin: 6% by weight
Titanium dioxide: 15% by weight
Disazo yellow AAA: 10% by weight According to the above formulation, components were mixed under heating in a kneader, dispersed and then kneaded by a twin roll. The kneaded mixture was subjected to injection molding by an injection molder to obtain a yellow solid drawing material 20 of 8.0 mm in diameter as shown in FIG. 1(B).

(1-4) Example 4

Urushi wax (melting point: 52° C.): 22% by weight
Rosin: 9% by weight
Paraffin wax 135F (Nippon Seiro Co., Ltd.): 23% by weight
Microcrystalline wax (Nippon Seiro Co., Ltd.): 5% by weight
Ethylene-vinyl acetate copolymer: 13% by weight
(content of vinyl acetate: 28% by weight, melt flow rate: 15 g/minute)
Talc: 8% by weight
Titanium dioxide: 10% by weight
Ultramarine: 6% by weight
Phthalocyanine blue: 4% by weight According to the above formulation, components were mixed under heating in a kneader, dispersed and then kneaded by a twin roll. The kneaded mixture was subjected to injection molding by an injection molder to obtain a blue solid drawing material 20 of 8.0 mm in diameter as shown in FIG. 1(B).

(1-5) Example 5

Haze wax (melting point: 52° C.): 34% by weight
Rosin ester: 12% by weight
Paraffin wax 155F (Nippon Seiro Co., Ltd.): 15% by weight
Low-density polyethylene (Sumitomo Chemical Co., Ltd.): 5% by weight
Ethylene-vinyl acetate copolymer: 3% by weight
(content of vinyl acetate: 28% by weight, melt flow rate: 40 g/minute)
Calcium carbonate: 6% by weight
Titanium dioxide: 15% by weight
Pyrazolone orange: 10% by weight According to the above formulation, components were mixed under heating in a kneader, dispersed and then kneaded by a twin roll. The kneaded mixture was subjected to injection molding by an injection molder to obtain an orange solid drawing material 20 of 8.0 mm in diameter as shown in FIG. 1(B).

(1-6) Example 6

Figure 2:
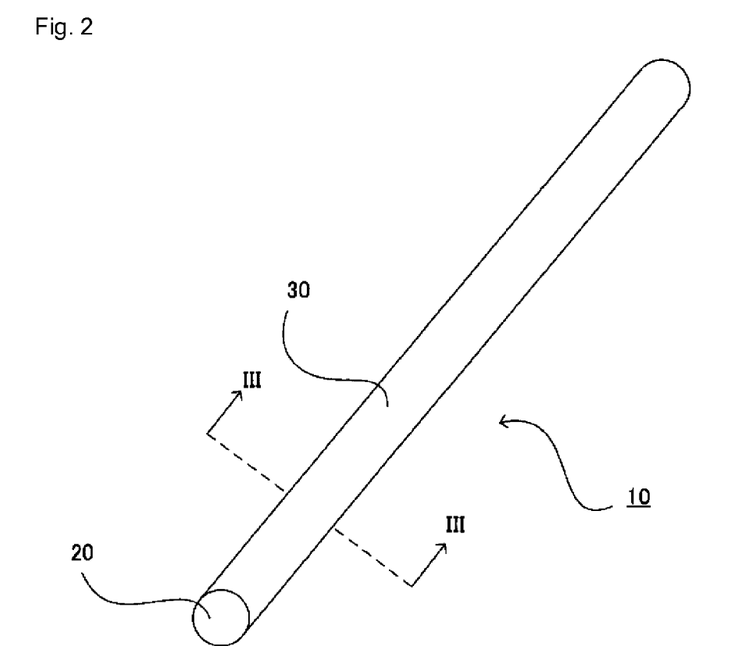
FIG. 2 A perspective view showing a solid drawing tool in which a protective sheet is wound around the solid drawing material in FIG. 1.
Figure 3:
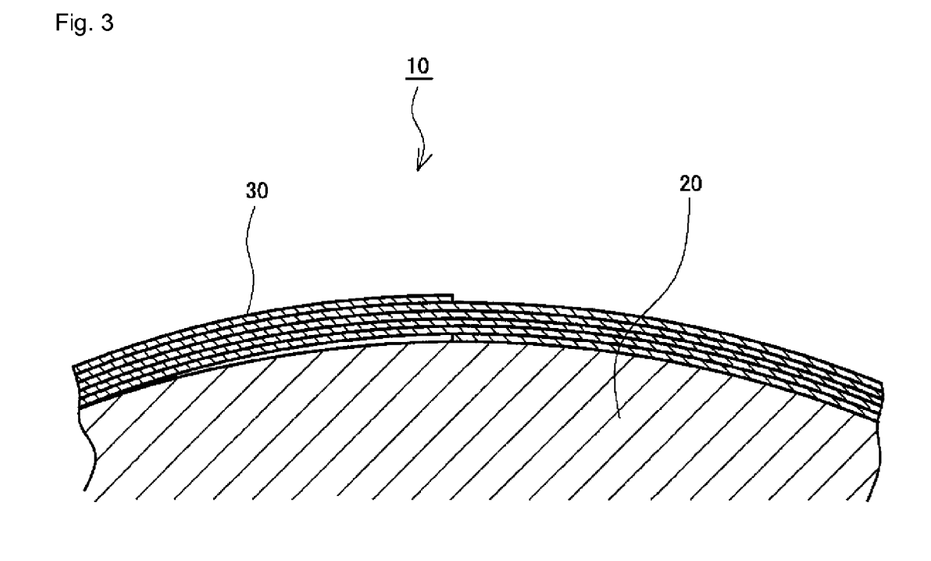
FIG. 3 A partially enlarged view of a cross section taken along III-III in FIG. 2.
Figure 4:
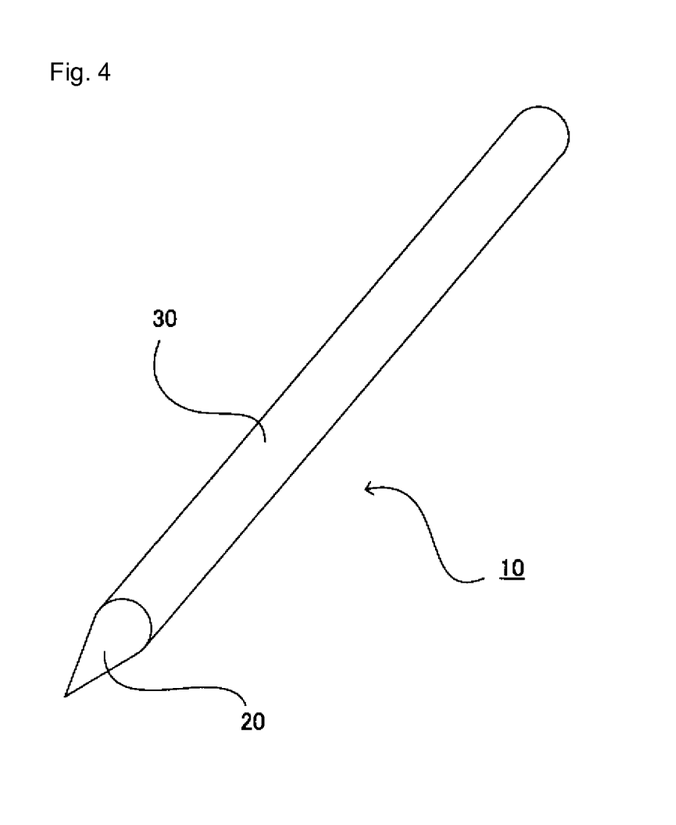
FIG. 4 A perspective view showing the solid drawing tool in FIG. 2 cut by a pencil sharpener.

Stearic acid glyceride (melting point: 61° C.): 43% by weight
Rosin ester: 16% by weight
Talc: 18% by weight
Titanium dioxide: 12% by weight
Permanent red: 11% by weight According to the above formulation, components were mixed under heating in a kneader, dispersed and then kneaded by a twin roll. The kneaded mixture was subjected to extrusion molding by a plunger extruder to obtain a red solid drawing material 20 measuring 7.0 mm in diameter and 120 mm in length as shown in FIG. 2. Then, a protective sheet 30 made of a polypropylene synthetic paper measuring 100 μm in thickness including an adhesive, 138 mm in width and 120 mm in length was wound around the red solid drawing material five times, as shown in FIG. 3, to obtain a solid drawing tool 10 measuring 8.0 mm in diameter and 120 mm in length as shown in FIG. 2.

(1-7) Example 7

In the same manner as in aforementioned Example 6, except that the protective sheet 30 of Example 6 was replaced by a protective sheet 30 made of a biaxially oriented polypropylene measuring 100 μm in thickness including an adhesive, 138 mm in width and 120 mm in length, a solid drawing tool 10 measuring 8.0 mm in diameter and 120 mm in length was obtained.

(1-8) Example 8

In the same manner as in aforementioned Example 6, except that the protective sheet 30 of Example 6 was replaced by a protective sheet 30 made of an art paper measuring 100 μm in thickness including an adhesive, 138 mm in width and 120 mm in length, a solid drawing tool 10 measuring 8.0 mm in diameter and 120 mm in length was obtained.

(1-9) Example 9

Haze wax (melting point: 52° C.): 43% by weight
Rosin: 16% by weight
Talc: 17% by weight
Titanium dioxide: 14% by weight
Disazo yellow AAA: 2% by weight
Phthalocyanine green: 8% by weight According to the above formulation, components were mixed under heating in a kneader, dispersed and then kneaded by a twin roll. The kneaded mixture was subjected to extrusion molding by a plunger extruder to obtain a green solid drawing material 20 measuring 7.0 mm in diameter and 120 mm in length. Then, a protective sheet 30 made of polyvinyl chloride measuring 80 μm in thickness including an adhesive, 141 mm in width and 120 mm in length was wound around the green solid drawing material six times to obtain a solid drawing tool 10 measuring 7.9 mm in diameter and 120 mm in length.

(1-10) Example 10

In the same manner as in aforementioned Example 9, except that the protective sheet 30 of Example 9 was replaced by a protective sheet 30 made of styrene measuring 80 μm in thickness including an adhesive, 141 mm in width and 120 mm in length, a solid drawing tool 10 measuring 7.9 mm in diameter and 120 mm in length was obtained.

(1-11) Comparative Example 1

Haze wax (melting point: 52° C.): 40% by weight
Paraffin wax 155F (Nippon Seiro Co., Ltd.): 10% by weight
White mineral oil: 10% by weight
Talc: 16% by weight
Titanium dioxide: 14% by weight
Disazo yellow AAA: 2% by weight
Phthalocyanine green: 8% by weight According to the above formulation, components were mixed under heating in a kneader and dispersed. The mixture was then kneaded by a twin roll, hot-melted, and poured into a predetermined mold, followed by solidification under cooling to obtain a green solid drawing material 20 with a cross section of 8.0 mm square.

(1-12) Comparative Example 2

Haze wax (melting point: 52° C.): 15% by weight
Paraffin wax 135F (Nippon Seiro Co., Ltd.): 10% by weight
Rosin: 16% by weight
Non-crystalline poly α-olefin: 0.5% by weight
White mineral oil: 10% by weight
Talc: 24.5% by weight
Titanium dioxide: 14% by weight
Disazo yellow AAA: 2% by weight
Phthalocyanine green: 8% by weight According to the above formulation, components were mixed under heating in a kneader and dispersed. The mixture was then kneaded by a twin roll, hot-melted, and poured into a predetermined mold, followed by solidification under cooling to obtain a green solid drawing material with a cross section of 8.0 mm square.

(1-13) Comparative Example 3

Urushi wax (melting point: 52° C.): 15% by weight
Fischer-Tropsch wax (melting point: 110° C.): 21% by weight
Montan wax: 12% by weight
Low-density polyethylene (Sumitomo Chemical Co., Ltd.): 21% by weight
Kaolin: 6% by weight
Titanium dioxide: 15% by weight
Disazo yellow AAA: 10% by weight According to the above formulation, components were mixed under heating in a kneader, dispersed and then kneaded by a twin roll. The kneaded mixture was subjected to injection molding by an injection molder to obtain a yellow solid drawing material of 8.0 mm in diameter.

(1-14) Comparative Example 4

Urushi wax (melting point: 52° C.): 22% by weight
Paraffin wax 135F (Nippon Seiro Co., Ltd.): 23% by weight
Microcrystalline wax (Nippon Seiro Co., Ltd.): 5% by weight
Ethylene-vinyl acetate copolymer: 22% by weight
(content of vinyl acetate: 28% by weight, melt flow rate: 15 g/minute)

Talc: 8% by weight
Titanium dioxide: 10% by weight
Ultramarine: 6% by weight
Phthalocyanine blue: 4% by weight According to the above formulation, components were mixed under heating in a kneader, dispersed and then kneaded by a twin roll. The kneaded mixture was subjected to injection molding by an injection molder to obtain a blue solid drawing material of 8.0 mm in diameter.

(1-15) Comparative Example 5

Haze wax (melting point: 52° C.): 34% by weight
Paraffin wax 155F (NIPPON SEIRO CO., LTD.): 15% by weight
Low-density polyethylene (Sumitomo Chemical Co., Ltd.): 15% by weight
Ethylene-vinyl acetate copolymer: 5% by weight
(content of vinyl acetate: 28% by weight, melt flow rate: 40 g/minute)
Calcium carbonate: 6% by weight
Titanium dioxide: 15% by weight
Pyrazolone orange: 10% by weight According to the above formulation, components were mixed under heating in a kneader, dispersed and then kneaded by a twin roll. The kneaded mixture was subjected to injection molding by an injection molder to obtain an orange solid drawing material of 8.0 mm in diameter.

(1-16) Comparative Example 6

In the same manner as in aforementioned Example 6, except that the protective sheet 30 of Example 6 was replaced by a protective sheet 30 made of a high-quality paper measuring 100 μm in thickness including an adhesive, 138 mm in width and 120 mm in length, a solid drawing tool measuring 8.0 mm in diameter and 120 mm in length was obtained.

(1-17) Comparative Example 7

According to the formulation similar to the aforementioned Example 6, components were mixed under heating in a kneader, dispersed and then kneaded by a twin roll. The kneaded mixture was subjected to extrusion molding by a plunger extruder to obtain a red solid drawing material measuring 7.8 mm in diameter and 120 mm in length. A protective sheet made of a polypropylene synthetic paper measuring 80 μm in thickness, 28 mm in width and 120 mm in length was wound around the red solid drawing material, and then joint portions were bonded using an adhesive to obtain a solid drawing tool measuring 8.0 mm in diameter and 120 mm in length.

(1-18) Comparative Example 8

In the same manner as in aforementioned Comparative Example 7, except that the protective sheet of Comparative Example 7 was replaced by a protective sheet made of an art paper measuring 80 μm in thickness, 28 mm in width and 120 mm in length, a solid drawing tool measuring 8.0 mm in diameter and 120 mm in length was obtained.

(1-19) Comparative Example 9

Urushi wax (melting point: 52° C.): 15% by weight
Fischer-Tropsch wax (melting point: 110° C.): 21% by weight
Montan wax: 12% by weight
Low-density polyethylene (Sumitomo Chemical Co., Ltd.): 21% by weight
Kaolin: 6% by weight
Titanium dioxide: 15% by weight
Disazo yellow AAA: 2% by weight
Phthalocyanine green: 8% by weight According to the above formulation, components were mixed under heating in a kneader, dispersed and then kneaded by a twin roll. The kneaded mixture was subjected to injection molding by an injection molder to obtain a green solid drawing material of 8.0 mm in diameter.

(1-20) Comparative Example 10

An adhesive was applied on the outer peripheral surface of a solid drawing material similar to the aforementioned Example 6, followed by mounting in a wood shaft measuring 8.0 mm in outer diameter and 7.1 mm in inner diameter to obtain a solid drawing tool measuring 8.0 mm in diameter and 120 mm in length.

(2) Evaluation Procedures

Examples 1 to 5, Comparative Examples 1 to 5

With regard to the solid drawing materials of Examples 1 to 5 and Comparative Examples 1 to 5, strength, colorability in the case of drawing on a paper, a PET film, glass and a whiteboard, and erasability were evaluated and confirmed.

(2-1) Strength

With regard to the respective solid drawing materials, three-point bending strength was measured at a temperature of 23° C. and a distance between supporting points of 40 mm, thereby determining a load (unit: N) at breakage.

(2-2) Colorability

The solid drawing materials according to Example 1 and Comparative Examples 1 and 2 were sharpened by cutting a tip using a cutter knife. The solid drawing materials according to Examples 2 to 5 and Comparative Examples 3 to 5 were sharpened by cutting their tips using a portable mini-sharpener. After drawing on a copy paper, a PET film, a glass plate and a whiteboard (WB) using each of the solid drawing materials, colorability was evaluated according to five-rank rating (A to E). Evaluation criteria were as follows.

A: Drawn lines were dark and clear.
B: Drawn lines could not be seen, although some disorders were recognized.
C: Drawn lines were faint and hard to see.
D: Drawn lines were considerably faint and could not be seen without attention.
E: Drawn lines were hardly seen, or could not be drawn.

(2-3) Erasability

After rubbing the line drawn on the PET film, the glass plate and the whiteboard in the above (2-2) using a tissue paper, erasability was evaluated according to five-rank rating (A to E). Evaluation criteria were as follows.

A: Drawn lines were satisfactorily erased and no drawn line remained.
B: Drawn lines were erased but slightly remained.
C: Drawn lines remained without being erased.
D: Drawn lines were hardly erased.

E: Drawn lines were not erased at all (provided that the sample was rated as D or E in the above (2-2), it was rated as E).

(2-4) Evaluation Results

The evaluation results with regard to the respective evaluation procedures using aforementioned Examples 1 to 5 and Comparative Examples 1 to 5 are shown in Table 1 below.

TABLE 1

|  | Strength (N) | Colorability | | | | Erasability | | |
|---|---|---|---|---|---|---|---|---|
|  |  | Copy paper | PET | Glass | WB | PET | Glass | WB |
| Example 1 | 46 | A | A | A | A | A | A | B |
| Example 2 | 38 | A | A | A | A | A | A | B |
| Example 3 | 89 | A | A | A | A | A | A | B |
| Example 4 | 51 | A | A | A | A | A | A | B |
| Example 5 | 64 | A | A | A | A | A | A | B |
| Comp. Ex. 1 | 10 | A | C | C | D | D | C | E |
| Comp. Ex. 2 | 17 | A | B | B | C | D | C | E |
| Comp. Ex. 3 | 102 | B | E | E | E | E | E | E |
| Comp. Ex. 4 | 62 | A | E | E | E | E | E | E |
| Comp. Ex. 5 | 75 | B | E | E | E | E | E | E |

As mentioned above, all solid drawing materials according to Examples 1 to 5 of the present invention exhibited satisfactory results. That is, with regard to the strength, Examples 1 to 5 exhibited numerical value enough to be suitable for practical use. Moreover, any product to be drawn was rated "A" for both colorability and erasability. Erasability in the case of drawing on a whiteboard was rated "B" since the erasability was slightly inferior to that of a commercially available marker only for a whiteboard.

To the contrary, Comparative Examples 1 to 5, which do not fall under the scope of the present invention, were inferior in all evaluation items except for colorability on a copy paper, in the test results.

First, in Comparative Example 1, tip was likely to break easily upon drawing since only haze wax was included and rosin was not blended. Moreover, it was impossible to draw darkly, regardless of softness because of slipping on the surface.

In Comparative Example 2, tip was likely to break easily upon drawing because of large amount of oil. Moreover, when a line drawn on a smooth surface was erased by rubbing, the drawn line was spread and was not easily erased.

In Comparative Examples 3 to 5, drawing on a paper was satisfactory performed without any problem because of high strength. However, it was impossible to draw on a smooth surface because of slipping on the surface.

(3) Evaluation Procedures

Examples 6 to 10, Comparative Examples 6 to 10

With regard to the solid drawing tools of Examples 6 to 10 and Comparative Examples 6 to 10, strength and cuttability by a pencil sharpener were evaluated.

(3-1) Strength

With regard to the respective solid drawing materials, three-point bending strength was measured at a temperature of 23° C. or 40° C. and a distance between supporting points of 60 mm, thereby determining a load (unit: N) at breakage.

(3-2) Cuttability by Pencil Sharpener

Five monitors were made to cut the solid drawing material to sharpen the tip of the solid drawing material under normal temperature and normal humidity (23° C., 50%) environment, and under high temperature and high humidity (35° C., 80%) environment (see FIG. 3) using a mini-pencil sharpener (trade name: Pocket Sharpener DPS-101 PLT) manufactured by Mitsubishi Pencil Co., Ltd., and they were made to make sensory evaluation as to the cuttability according to the following five-rank rating (scores 1 to 5), and thus determining the average.

1: Remarkably poor.
2: Poor.
3: Neither poor nor satisfactory.
4: Satisfactory.
5: Remarkably satisfactory.

(3-3) Evaluation Results

The evaluation results with regard to the respective evaluation procedures using the respective Examples and Comparative Examples are shown in Table 2 below.

TABLE 2

|  | Strength (N) (23° C.) | Strength (N) (40° C.) | Cuttability (normal) | Cuttability (high) |
|---|---|---|---|---|
| Example 6 | 69 | 56 | 5.0 | 4.8 |
| Example 7 | 56 | 53 | 5.0 | 5.0 |
| Example 8 | 89 | 72 | 4.8 | 4.4 |
| Example 9 | 84 | 67 | 5.0 | 5.0 |
| Example 10 | 62 | 50 | 5.0 | 5.0 |
| Comp. Ex. 6 | 64 | 51 | 2.2 | 1.0 |
| Comp. Ex. 7 | 40 | 21 | 3.8 | 2.6 |
| Comp. Ex. 8 | 41 | 23 | 3.2 | 2.4 |
| Comp. Ex. 9 | 29 | 22 | 4.2 | 4.8 |
| Comp. Ex. 10 | 118 | 72 | 4.8 | 1.8 |

As mentioned above, the solid drawing tools according to Examples 6 to 10 of the present invention exhibited satisfactory results for all evaluation procedures. That is, the strength of the solid drawing tool per se exhibited values at least 50 N or more under conditions of both temperatures of 23° C. and 40° C. Moreover, the cuttability was highly evaluated (more than score 4 on average) under both measuring conditions of normal temperature and normal humidity, and high temperature and high humidity, in all Examples. Moreover, a protective sheet was neither peeled nor broken upon cutting.

To the contrary, in the test results of Comparative Examples 6 to 10 which do not fall within the scope of the present invention, evaluation results were inferior in at least one item.

The high-quality paper used as the protective sheet in Comparative Example 6 was hard and was likely to absorb moisture. Therefore, in Comparative Example 6 in which the high-quality paper was wound, cuttability was apparently inferior to Example 1 in which the same solid drawing material was used. Under high temperature and high humidity conditions, the protective sheet was torn.

In Comparative Examples 7 and 8, the solid drawing tools were weak and were likely to break easily since the protective sheet was wound once, and lacked strength. Moreover, since the adhesive of the protective sheet was applied only to the joint site, the protective sheet was easily peeled off from the solid drawing material. Whereby, the cuttability was apparently inferior as compared with Example 6 in which the same solid drawing material was used.

Comparative Example 9 was not inferior in cuttability, but was considered to be not suitable for practical use since the strength was remarkably low and the solid drawing tool was likely to break easily.

Comparative Example 10 was rigid and strong as compared with Example 6 in which the same solid drawing material was used since it was provided with a wood shaft. However, the wood shaft has a small thickness of 0.1 mm and therefore exhibited low adhesive strength with the solid drawing material, and thus causing breakage of the shaft under high humidity conditions, resulting in remarkably low evaluation of the cuttability as compared with Example 6.

INDUSTRIAL APPLICABILITY

The present invention is usable as a solid drawing material which can draw smoothly and darkly on smooth non-absorbing surfaces of a coated paper, plastic, metal, glass, a whiteboard and the like, as well as papers such as a conventional high-quality paper, a drawing paper, and a copy paper, and also can easily erase a drawing on these non-absorbing surfaces using a fabric, papers such as a tissue paper, a whiteboard eraser and the like, and a solid drawing tool which is obtained by winding a protective sheet around the solid drawing material.

The invention claimed is:

1. A solid drawing material comprising:
at least a resin component, a wax component, a pigment, titanium dioxide and a filler, containing, as said resin component, at least one of rosin and a modified rosin in an amount within a range of 0.5% by weight or more and 20% by weight or less, and containing, as said wax component, at least one of a glycerin fatty acid ester and a pentaerythritol fatty acid ester, each having a melting point of 45° C. or higher in an amount within a range of 8% by weight or more and 50% by weight or less, and
a component having a melting point of 40° C. or lower in the amount within a range of 4.5% by weight or less in addition to said resin component, said wax component, said pigment, said titanium dioxide and said filler.

2. The solid drawing material according to claim 1, a ratio of said resin component to said wax component being within a range from 2:1 to 1:25.

3. The solid drawing material according to claim 1, containing 5% by weight or more of said titanium dioxide.

4. The solid drawing material according to claim 1, further comprising:
at least one of polyethylene and an ethylene-vinyl acetate copolymer in the amount within a range of 20% by weight or less as an additional resin component other than said resin component, and one or a mixture of more selected from a group consisting of paraffin wax, ozocerite, Fischer-Tropsch wax and polyethylene wax each having a melting point of 45° C. or higher in an amount within a range of 30% by weight or less as an additional wax component other than said wax component.

5. The solid drawing material according to claim 4, said polyethylene being one or a mixture of more selected from a group consisting of low-density polyethylene, linear low-density polyethylene, and ultra low-density polyethylene, and said ethylene-vinyl acetate copolymer containing 30% by weight or less of vinyl acetate, and also having a melt flow rate of 2 g/minute or more.

6. The solid drawing material according to claim 5, a ratio of said additional resin component to said additional wax component being within a range from 3:1 to 1:20.

7. The solid drawing material according to claim 4, a ratio of said additional resin component to said additional wax component being within a range from 3:1 to 1:20.

8. A solid drawing tool comprising: the solid drawing material according to claim 1, and a protective sheet being wound around an outer peripheral surface of said solid drawing material two times or more, said solid drawing material being capable of being sharpened together with said protective sheet by a pencil sharpener.

9. The solid drawing tool according to claim 8, the protective sheet being formed of a surface-processed paper or a synthetic paper.

10. The solid drawing tool according to claim 5, further comprising an adhesive being partially or entirely applied to an inner surface side of said protective sheet.

11. The solid drawing tool according to claim 8, the protective sheet being formed of polyester, nylon, polystyrene, polyvinyl chloride or biaxially oriented polypropylene.

12. The solid drawing tool according to claim 11, further comprising an adhesive being partially or entirely applied to an inner surface side of said protective sheet.

13. The solid drawing tool according to claim 8, further comprising an adhesive being partially or entirely applied to an inner surface side of said protective sheet.

* * * * *